(12) United States Patent
Fan et al.

(10) Patent No.: US 11,914,169 B2
(45) Date of Patent: Feb. 27, 2024

(54) OPTICAL MEMBER DRIVING MECHANISM

(71) Applicant: TDK TAIWAN CORP., Taoyuan (TW)

(72) Inventors: Chen-Hsien Fan, Taoyuan (TW);
Sung-Mao Tsai, Taoyuan (TW);
Chia-Che Wu, Taoyuan (TW);
Yueh-Lin Lee, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 896 days.

(21) Appl. No.: 16/751,785

(22) Filed: Jan. 24, 2020

(65) Prior Publication Data

US 2021/0063848 A1    Mar. 4, 2021

Related U.S. Application Data

(60) Provisional application No. 62/894,295, filed on Aug. 30, 2019.

(30) Foreign Application Priority Data

Dec. 20, 2019   (EP) ...................................... 19218896

(51) Int. Cl.
*G02B 27/64* (2006.01)
*G01B 11/24* (2006.01)
(Continued)

(52) U.S. Cl.
CPC ............ *G02B 27/646* (2013.01); *G01B 11/24* (2013.01); *G01S 7/4813* (2013.01); *G01S 7/4816* (2013.01); *G01S 7/4817* (2013.01); *G01S 17/42* (2013.01); *G02B 7/005* (2013.01); *G02B 7/04* (2013.01); *G02B 7/1821* (2013.01); *G02B 26/0816* (2013.01); *G02B 26/101* (2013.01); *G02B 26/105* (2013.01); *G03B 5/00* (2013.01); *G03B 5/06* (2013.01); *H02K 41/0356* (2013.01); *G02B 7/1805* (2013.01); *G03B 3/10* (2013.01); *G03B 5/04* (2013.01); *G03B 13/36* (2013.01); *G03B 17/17* (2013.01); *G03B 2205/0007* (2013.01); *G03B 2205/0046* (2013.01); *G03B 2205/0069* (2013.01); *H02K 5/24* (2013.01); *H02K 11/01* (2016.01); *H02K 2201/18* (2013.01); *H04N 23/54* (2023.01)

(58) Field of Classification Search
CPC ................ G02B 7/1805; G02B 7/1821; G02B 26/0816; G02B 7/003; G03B 17/17
USPC .................................................. 359/833, 872
See application file for complete search history.

(56) References Cited

U.S. PATENT DOCUMENTS 4,410,233 A * 10/1983 Gerhardt .............. G02B 7/1821
359/198.1
11,322,628 B2 * 5/2022 Wu .................... H01L 31/02002
(Continued)

*Primary Examiner* — Ricky D Shafer
(74) *Attorney, Agent, or Firm* — MUNCY, GEISSLER, OLDS & LOWE, P.C.

(57) ABSTRACT

An optical member driving mechanism is provided. The optical member driving mechanism is configured to hold an optical member and drive the optical member to move. The optical member driving mechanism includes a first movable portion, a fixed portion, and a driving assembly. The first movable portion is movable relative to the fixed portion. The driving assembly is configured to drive the first movable portion to move relative to the fixed portion.

15 Claims, 10 Drawing Sheets

(51) Int. Cl.

| | | |
|---|---|---|
| G01S 7/481 | (2006.01) | |
| G01S 17/42 | (2006.01) | |
| G02B 7/00 | (2021.01) | |
| G02B 7/04 | (2021.01) | |
| G02B 7/182 | (2021.01) | |
| G02B 26/08 | (2006.01) | |
| G02B 26/10 | (2006.01) | |
| G03B 5/00 | (2021.01) | |
| G03B 5/06 | (2021.01) | |
| H02K 41/035 | (2006.01) | |
| G02B 7/18 | (2021.01) | |
| G03B 3/10 | (2021.01) | |
| G03B 5/04 | (2021.01) | |
| G03B 13/36 | (2021.01) | |
| G03B 17/17 | (2021.01) | |
| H02K 5/24 | (2006.01) | |
| H02K 11/01 | (2016.01) | |
| H04N 23/54 | (2023.01) | |

(56) References Cited

U.S. PATENT DOCUMENTS

| | | | |
|---|---|---|---|
| 11,340,418 B2 * | 5/2022 | Wu | H04N 5/2254 |
| 11,422,333 B2 * | 8/2022 | Chen | G02B 13/001 |
| 11,662,650 B2 * | 5/2023 | Hu | G03B 30/00 |
| | | | 359/824 |
| 2005/0046979 A1 * | 3/2005 | Hiley | G02B 7/182 |
| | | | 359/877 |
| 2008/0240704 A1 * | 10/2008 | Takahashi | G03B 17/00 |
| | | | 396/419 |
| 2009/0122406 A1 * | 5/2009 | Rouvinen | G03B 17/17 |
| | | | 359/555 |
| 2012/0170095 A1 * | 7/2012 | Dolleris | G02B 7/1821 |
| | | | 359/212.2 |
| 2017/0329111 A1 * | 11/2017 | Hu | H04N 5/247 |
| 2018/0109660 A1 * | 4/2018 | Yoon | H04N 5/23287 |
| 2018/0364450 A1 * | 12/2018 | Lee | G02B 7/1805 |
| 2019/0004328 A1 * | 1/2019 | Lee | G02B 27/646 |
| 2020/0400464 A1 * | 12/2020 | Yedid | G02B 7/1827 |

* cited by examiner

OPTICAL MEMBER DRIVING MECHANISM

CROSS REFERENCE TO RELATED APPLICATIONS

The present application claims priority to U.S. Provisional Patent Applications No. 62/894,295, filed in Aug. 30, 2019, and Europe Patent Applications No. 19218896.9, filed on Dec. 20, 2019, which are incorporated by reference herein in their entirety.

BACKGROUND OF THE INVENTION

Field of the Invention

The application relates in general to an optical member driving mechanism, and in particular, to an optical member driving mechanism configured to drive an optical member to rotate.

Description of the Related Art

Thanks to technological advancements, the latest consumer electronic devices (such as tablet computers and smartphones) now usually include a lens module capable of aiding in photography or recording video. These electronic devices have become commonplace, and have been developed to be more convenient and thin. Users are given more and more choices. However, when a lens with a long focal length is disposed in the electronic device, the thickness of the electronic device is increased, and as such it is hard to make the electronic device thin.

BRIEF SUMMARY OF INVENTION

To address the deficiencies of conventional products, an embodiment of the invention provides an optical member driving mechanism, configured to hold an optical member and drive the optical member to move. The optical member driving mechanism includes a first movable portion, a fixed portion, and a driving assembly. The first movable portion is movable relative to the fixed portion. The driving assembly is configured to drive the first movable portion to move relative to the fixed portion In some embodiments, the optical member is configured to adjust an emission direction of light from an incident direction to an outgoing direction, and the driving assembly is configured to drive the first movable portion to rotate around a first axis relative to the fixed portion, wherein the incident direction is not parallel to the outgoing direction, and the first axis is perpendicular to the incident direction or the outgoing direction.

In some embodiments, the optical member driving mechanism further comprises a second movable portion, the optical member is disposed on the second movable portion, and the driving assembly can drive the second movable portion to rotate around a second axis relative to the first movable portion, wherein an acute angle is formed between the second axis and the first axis. For example, the acute angle is greater than 45 degrees and less than 90 degrees. The second axis is not parallel or perpendicular to the outgoing direction. When the driving assembly drives the first movable portion to rotate around the first axis relative to the fixed portion, the second axis rotates around the first axis.

In some embodiments, the first movable portion comprises a plurality of first supporting portions, a plurality of second supporting portions, and a plurality of connecting portions. The first supporting portions are pivotally connected to the fixed portion. The second supporting portions are pivotally connected to the second movable portion. The connecting portions are connected to the first supporting portions and the second supporting portions. The first supporting portions are arranged along the first axis, and the second supporting portions are arranged along the second axis.

In some embodiments, the first movable portion has a C-shaped structure. At least one of the first supporting portions and at least one of the second supporting portions are respectively disposed on the opposite ends of the C-shaped structure.

In some embodiments, the fixed portion comprises a plurality of first engaging portions, and the first supporting portions are embedded in the first engaging portions. The first engaging portions have a plurality of chamfers or fillets, and the first supporting portions contact the chamfers or fillets of the first engaging portions. The second movable portion comprises a plurality of second engaging portions, and the second supporting portions are embedded in the second engaging portions. The second engaging portions have a plurality of chamfers or fillets, and the second supporting portions contact the chamfers or fillets of the second engaging portions.

In some embodiments, the intersection point of the first axis and the second axis is adjacent to the center of the optical member as seen from the incident direction.

In some embodiments, the first movable portion is made of metal.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical member driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
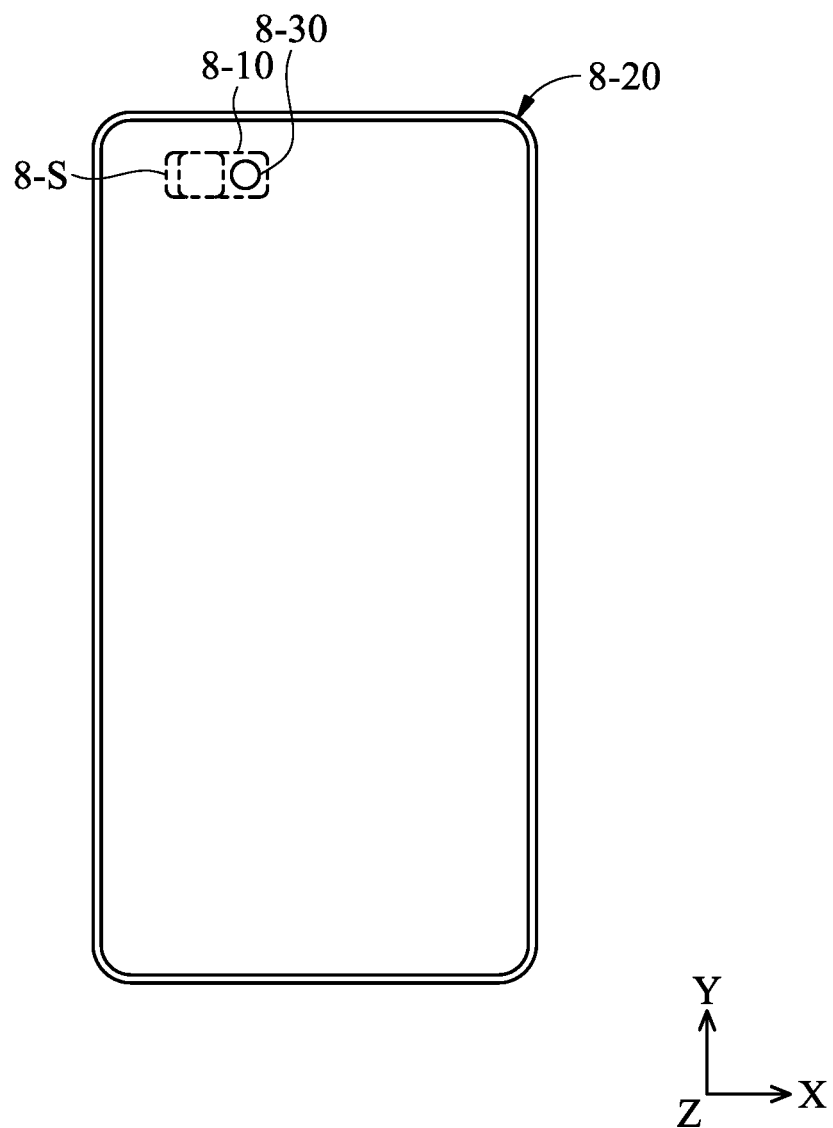
FIG. 1 is a schematic diagram of an electronic device according to an embodiment of the invention.
Figure 2:
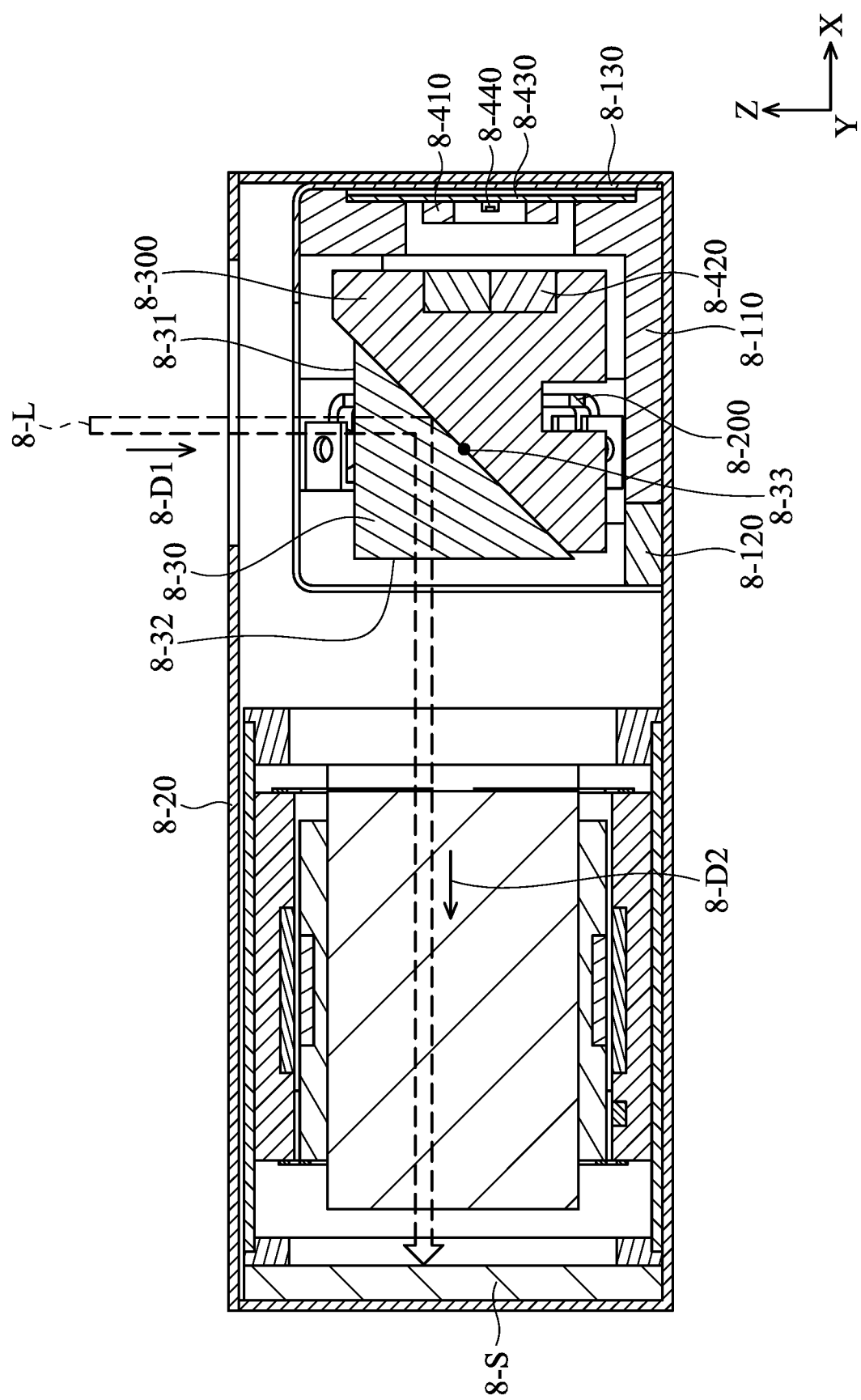
FIG. 2 is a partial cross-sectional view of the electronic device according to an embodiment of the invention.

Referring to FIGS. 1 and 2, in an embodiment of the invention, an optical member driving mechanism 8-10 can be disposed in an electronic device 8-20. The optical member driving mechanism 8-10 is configured to hold an optical member 8-30 and drive the optical member 8-30 to move relative to an image sensor module 8-S in the electronic device 8-20, so as to achieve the purpose of focus adjustment. For example, the electronic device 8-20 can be a digital camera or a smart phone having the function of capturing photographs or making video recordings, and the optical member 8-30 can be a prism or a mirror. When capturing photographs or making video recordings, light 8-L enters the optical member driving mechanism 8-10 along an incident direction 8-D1, and moves along an outgoing direction 8-D2 to reach the image sensor module 8-S after reflected by the optical member 8-30.

It should be noted that, in this embodiment, the light 8-L enters the optical member 8-30 from a first surface 8-31 of the optical member 8-30, and leaves the optical member 8-30 from a second surface 8-32. In some embodiments, the disposing orientation of the optical member driving mechanism 8-10 can be adjusted, the light 8-L can enter the optical member 8-30 from the second surface 8-32 of the optical member 8-30 and leave the optical member 8-30 from the first surface 8-31. In other words, in some embodiments, the incident direction 8-D1 and the outgoing direction 8-D2 can be exchanged.

Figure 3:
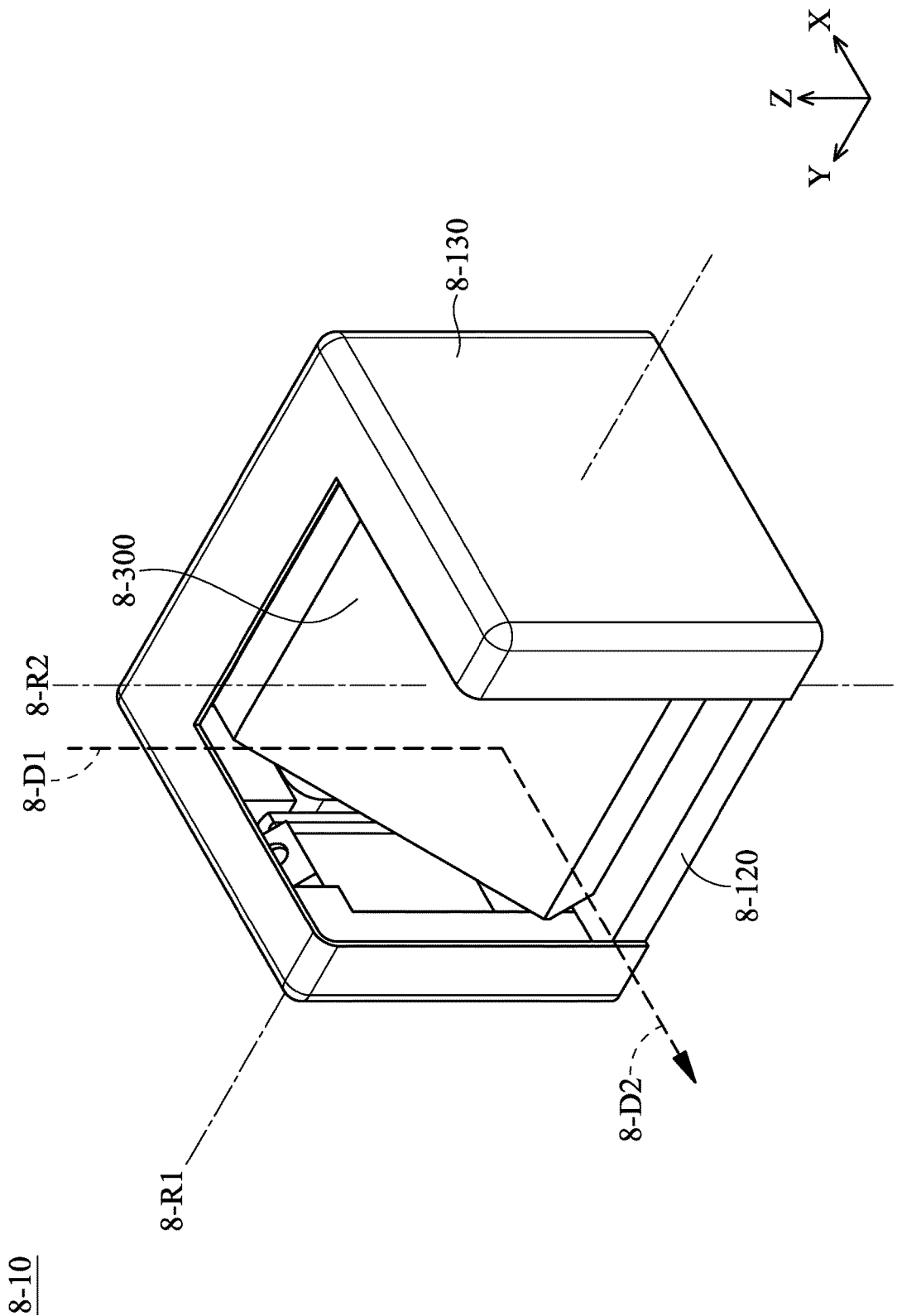
FIG. 3 is a schematic diagram of an optical member driving mechanism according to an embodiment of the invention.
Figure 4:
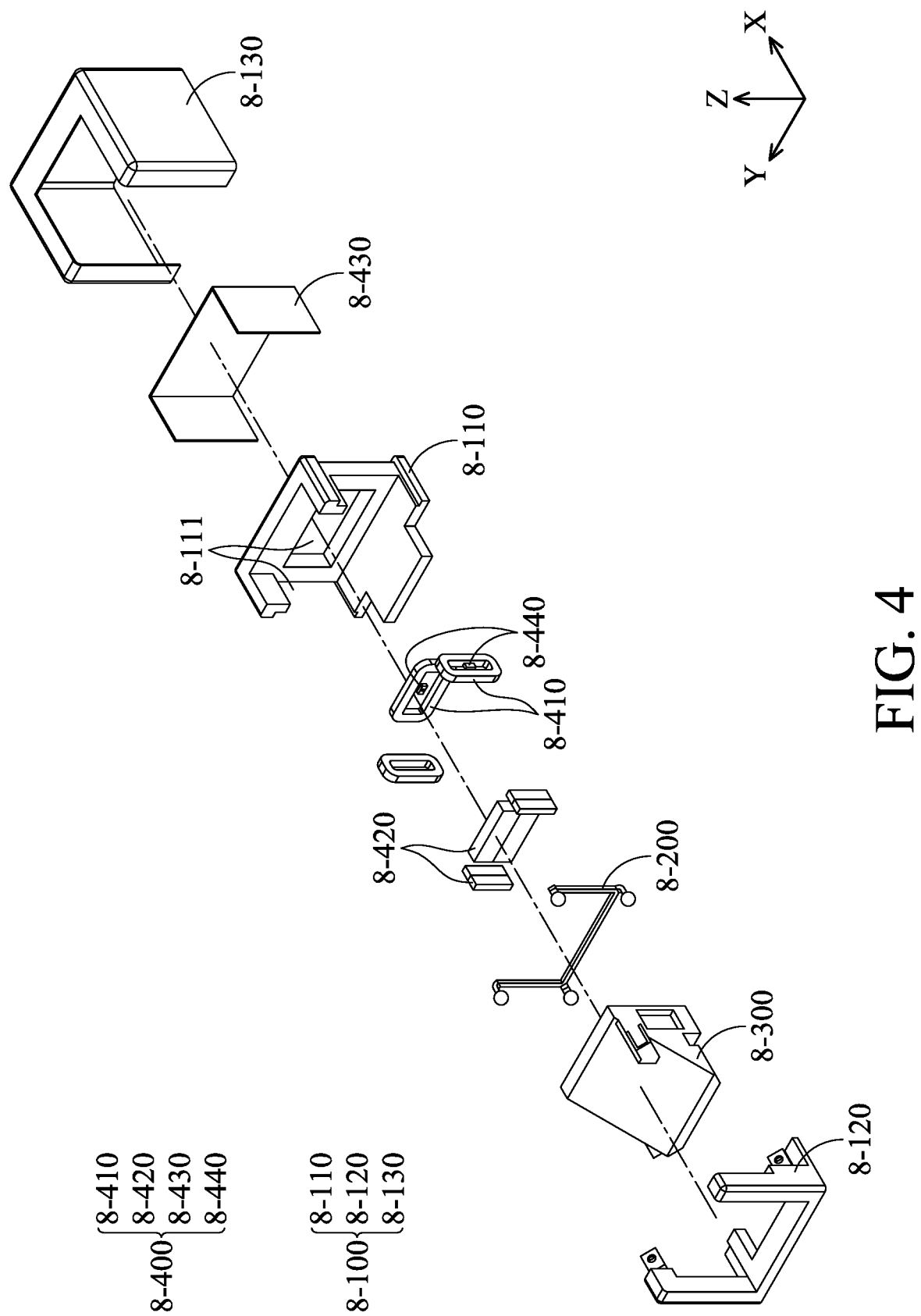
FIG. 4 is an exploded-view diagram of the optical member driving mechanism according to an embodiment of the invention.

FIG. 3 is a schematic diagram of the optical member driving mechanism 8-10, and FIG. 4 is an exploded-view diagram of the optical member driving mechanism 8-10. As shown in FIGS. 3 and 4, the optical member driving mechanism 8-10 primarily includes a fixed portion 8-100, a first movable portion 8-200, a second movable portion 8-300, and a driving assembly 8-400.

The fixed portion 8-100 includes a base 8-110, a frame 8-120, and a case 8-130. The base 8-110 and the frame 8-120 are fixedly assembled to each other, and the case 8-130 covers the base 8-110, the frame 8-120, the first movable portion 8-200, the second movable portion 8-300, and the driving assembly 8-400, so as to protect the aforementioned members from an impact with the external components.

Figure 5:
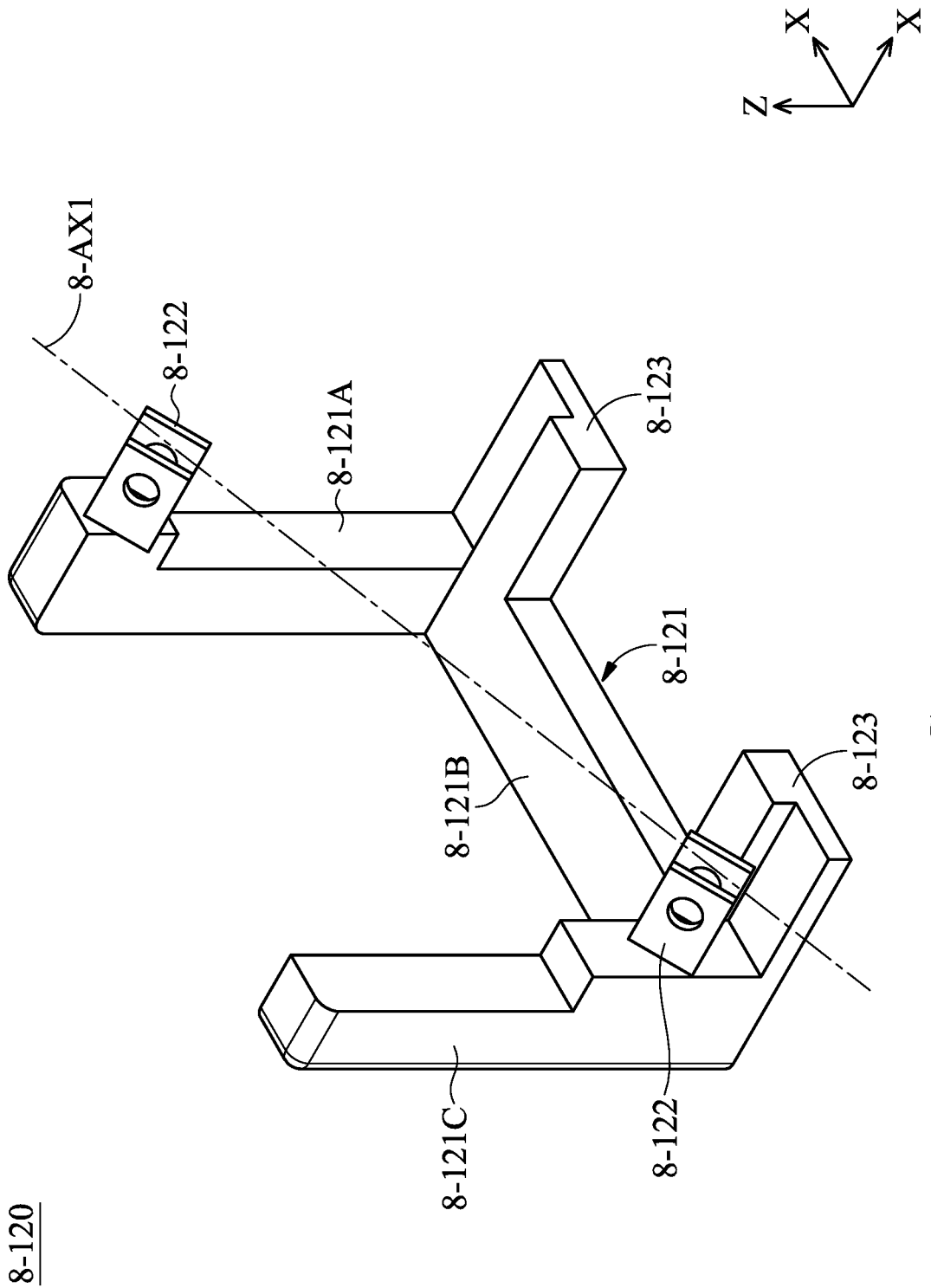
FIG. 5 is a schematic diagram of a frame according to an embodiment of the invention.
Figure 6:
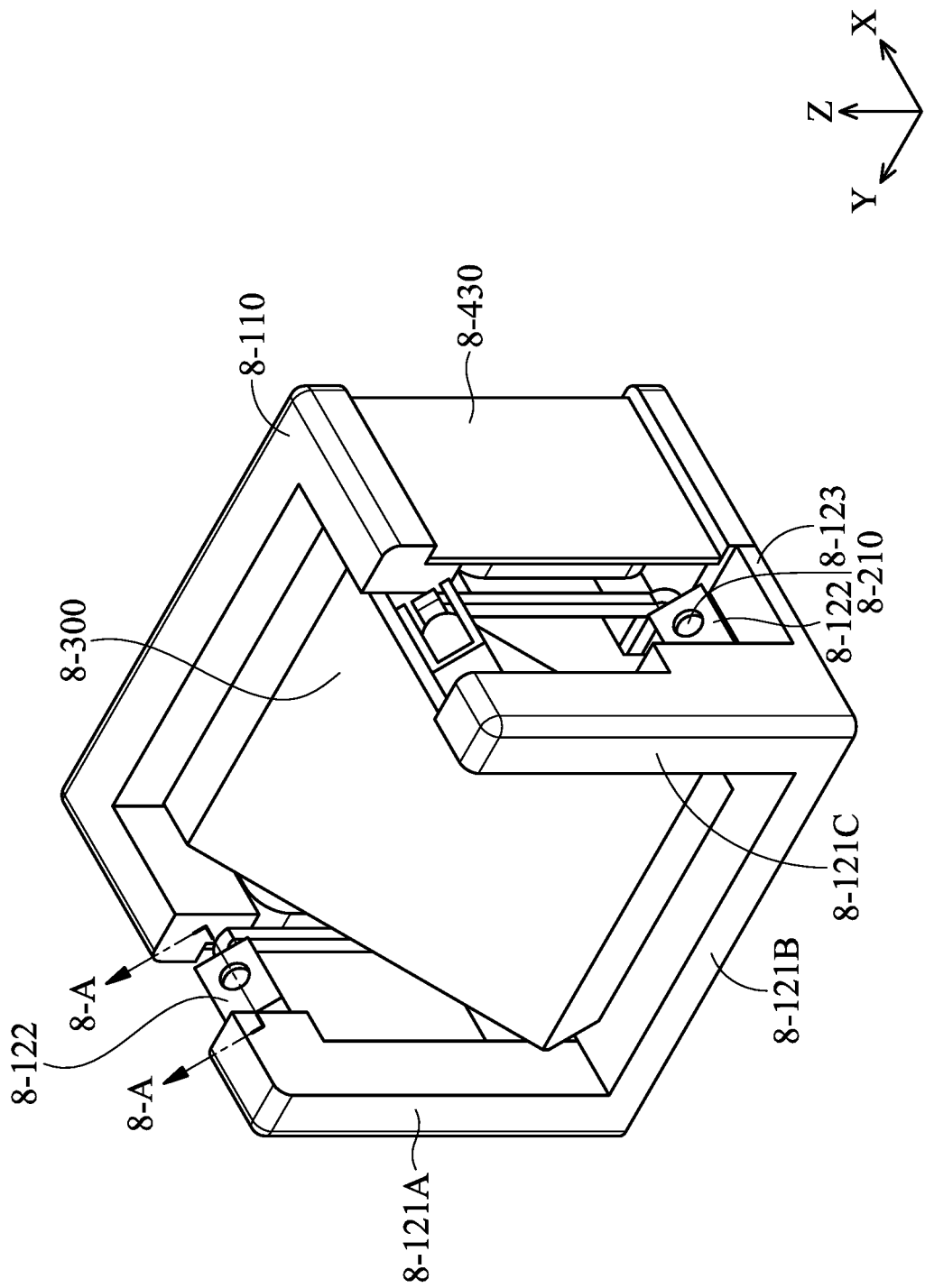
FIG. 6 is a schematic diagram of the optical member driving mechanism according to an embodiment of the invention, wherein a case is omitted.

As shown in FIGS. 4-6, the frame 8-120 includes a main body 8-121 and two first engaged portions 8-122. The main body 8-121 has a C-shaped structure, including a first section 8-121A, a second section 8-121B, and a third section 8-121C. The second section 8-121B connects the first section 8-121A to the third section 8-121C. The longitudinal axis of the second section 8-121B is perpendicular to the longitudinal axis of the first section 8-121A and the longitudinal axis of the third section 8-121C.

Two first engaged portions 8-122 are disposed on the surface of the main body 8-121 facing the base 8-110, and arranged along a first axis 8-AX1. Since the first axis 8-AX1 is inclined relative to the longitudinal axis of the first section 8-121A and the longitudinal axis of the second section 8-121B, one of the first engaged portions 8-122 is adjacent to the connecting portion between the second section 8-121B and the third section 8-121C, and the other one of the first engaged portions 8-122 is adjacent to an end of the first section 8-121A which is not connected to the second section 8-121B.

Furthermore, the frame 8-120 has at least one contacting portion 8-123 extending toward the base 8-110. In the outgoing direction 8-D2, the thickness of the contacting portion 8-123 is greater than the thickness of the first engaged portion 8-122. Therefore, when the base 8-110 is joined to the frame 8-120, the contacting portion 8-123 contacts the base 8-110, and a gap is formed between the first engaged portion 8-122 and the base 8-110.

Figure 7:
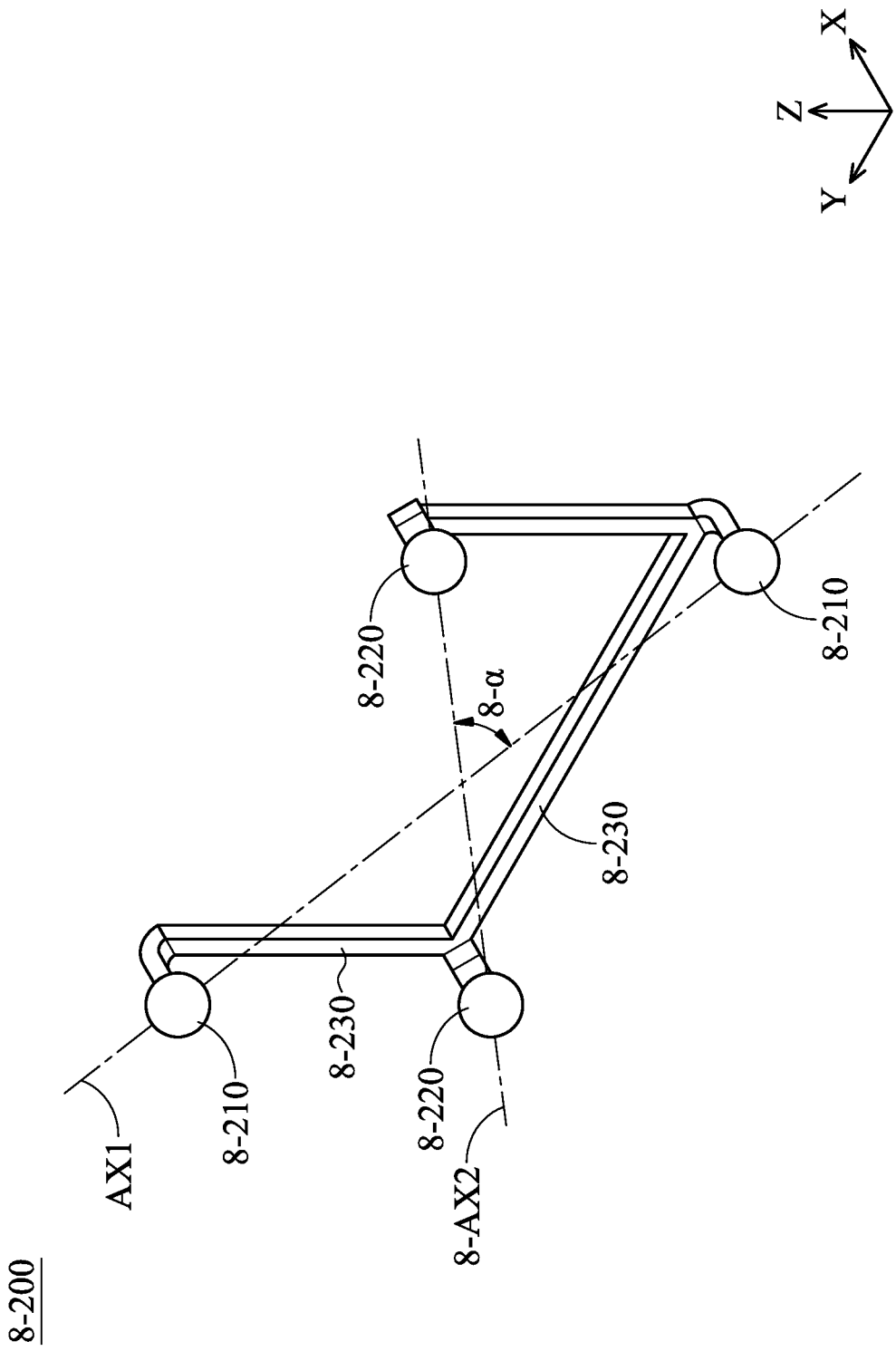
FIG. 7 is a schematic diagram of a first movable portion according to an embodiment of the invention.

Referring to FIG. 7, in this embodiment, the first movable portion 8-200 also has a C-shaped structure, and includes two first supporting portions 8-210, two second supporting portions 8-220, and a plurality of connecting portions 8-230. Two first supporting portions 8-210 are arranged along the first axis 8-AX1, two second supporting portions 8-220 are arranged along a second axis 8-AX2, and the connecting portions 8-230 are connected to the first supporting portions 8-210 and the second supporting portions 8-220. An acute angle 8-α can be formed between the first axis 8-AX1 and the second axis 8-AX2 (for example, the acute angle 8-α can be greater than 45 degrees and less than 90 degrees (such as 60 degrees)). Therefore, one of the first supporting portions 8-210 and one of the second supporting portions 8-220 are respectively disposed on the two ends of the C-shaped structure. In this embodiment, the intersection point of the first axis 8-AX1 and the second axis 8-AX2 is adjacent to the center 8-33 of the optical member 8-30 as seen from the incident direction 8-D1.

Figure 8:
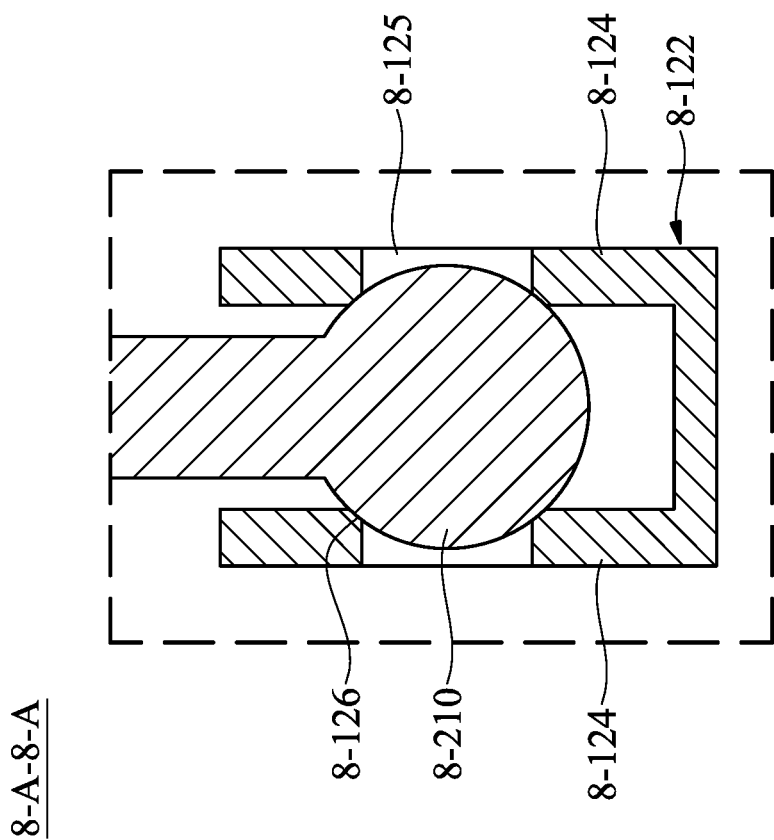
FIG. 8 is a cross-sectional view along the line 8-A-8-A in FIG. 6.

As shown in FIGS. 6 and 8, the first supporting portion 8-210 has a ball structure. Each of the first engaging portions 8-122 has two plates 8-124, and each of the plates 8-124 has a through hole 8-125. The distance between two plates 8-124 is less than the diameter of the first supporting portion 8-210, and the diameter of the through hole 8-125 is less than the diameter of the first supporting portion 8-210. When the first movable portion 8-200 is connected to the fixed portion 8-100, the first supporting portion 8-210 is disposed in the first engaging portion 8-122, and the first supporting portion 8-210 is clamped by two plates 8-124 and enters the through holes 8-125. Therefore, the first movable portion 8-200 can be pivotally connected to the fixed portion 8-100 through the first supporting portion 8-210 and the first engaging portion 8-122. The first movable portion 8-200 can rotate around the first axis 8-AX1 relative to the fixed portion 8-100.

In this embodiment, the first movable portion 8-200 is made of metal, and the portion of the through hole 8-125 contacting the first supporting portion 8-210 has a chamfer or a fillet, so as to reduce the debris caused by the friction between the first supporting portion 8-210 and the first engaging portion 8-122 during the rotation of the first supporting portion 8-210.

Figure 9:
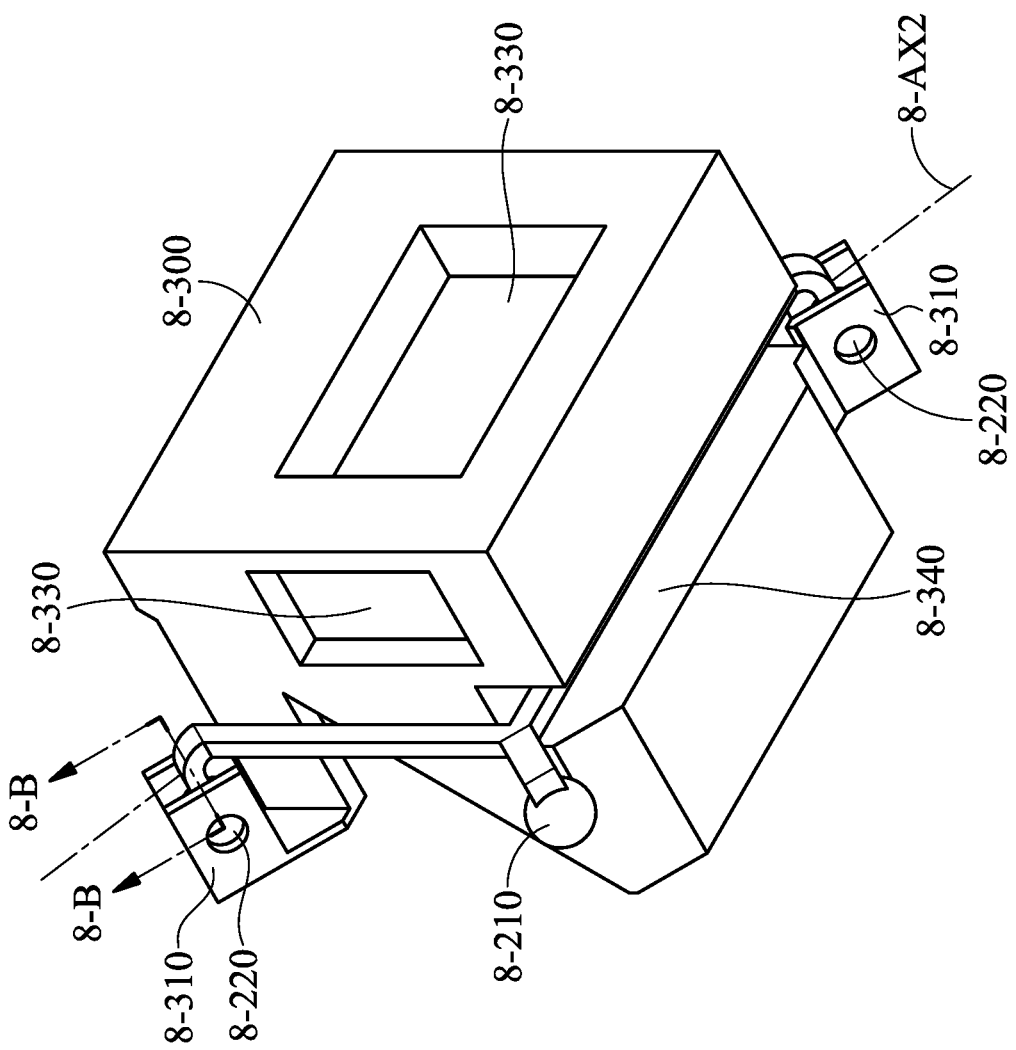
FIG. 9 is a schematic diagram of a second movable portion according to an embodiment of the invention.
Figure 10:
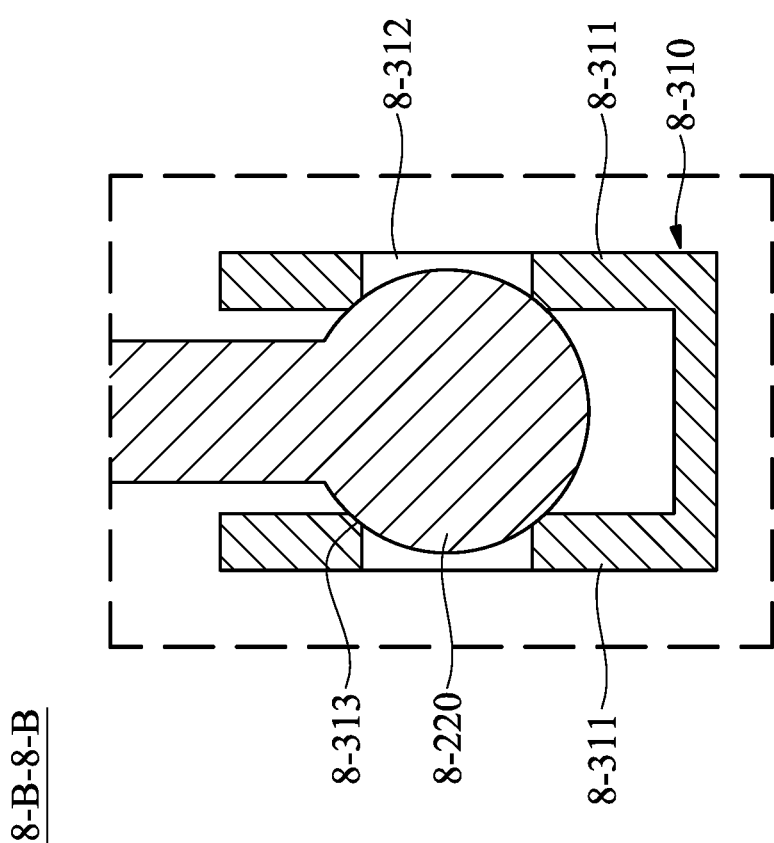
FIG. 10 is a cross-sectional view along the line 8-B-8-B in FIG. 9.

Referring to FIGS. 9 and 10, the second movable portion 8-300 can be an optical member holder, and the optical member 8-30 can be disposed on the second movable portion 8-300. The second movable portion 8-300 has two second engaging portions 8-310 arranged along the second axis 8-AX2. Each of the second engaging portions 8-310 has two plates 8-311, and each of the plates 8-311 has a through hole 8-312. The distance between two plates 8-311 is less than the diameter of the second supporting portion 8-220, and the diameter of the through hole 8-312 is less than the diameter of the second supporting portion 8-220. When the second movable portion 8-300 is connected to the first movable portion 8-200, the second supporting portion 8-220 is disposed in the second engaging portion 8-310, and the second supporting portion 8-220 is clamped by two plates 8-311 and enters the through holes 8-312. Therefore, the second movable portion 8-300 can be pivotally connected to the first movable portion 8-200 through the second supporting portion 8-220 and the second engaging portion 8-310. The second movable portion 8-300 can rotate around the second axis 8-AX2 relative to the first movable portion 8-200.

In this embodiment, the first movable portion 8-200 is made of metal, and the portion of the through hole 8-312 contacting the second supporting portion 8-220 has a chamfer or a fillet, so as to reduce the debris caused by the friction between the second supporting portion 8-220 and the second engaging portion 8-310 during the rotation of the second supporting portion 8-220.

It should be noted that, since the first movable portion 8-200 can rotate around the first axis 8-AX1 relative to the fixed portion 8-100, when the first movable portion 8-200 rotates, the second axis 8-AX2 rotates around the first axis 8-AX1 simultaneously. Thus, the second axis 8-AX2 can rotate to the position where is not perpendicular or parallel to the outgoing direction 8-D2.

Furthermore, the outer surface and the bottom surface of the second movable portion 8-300 respectively include a plurality of depressions 8-330 and a recess 8-340. When the first movable portion 8-200 is joined to the second movable portion 8-300, at least a portion of the first movable portion 8-200 (such as one of the connecting portion s 8-230) is accommodated in the recess 8-340.

Referring to FIG. 4, the driving assembly 8-400 includes at least one first electromagnetic driving member 8-410, at least one second electromagnetic driving member 8-420, a circuit board 8-430, and at least one position sensor 8-440.

The circuit board 8-430 is affixed to the fixed portion 8-100 and clamped between the base 8-110 and the case 8-130. The first electromagnetic driving member 8-410 is disposed on the circuit board 8-430 and passes through the openings 8-111 of the base 8-110. The second electromagnetic driving member 8-420 is dispose on the second movable portion and accommodated in the depressions 8-330. The first electromagnetic driving member 8-410 corresponds to the second electromagnetic driving member 8-420.

In this embodiment, the first electromagnetic driving member 8-410 is a coil, and the second electromagnetic driving member 8-420 is a magnet. When a current flows through the first electromagnetic driving member 8-410, an electromagnetic effect is generated between the first electromagnetic driving member 8-410 and the second electromagnetic driving member 8-420, and a driving force can be applied on the second movable portion 8-300.

As shown in FIG. 4, since the driving mechanism 8-400 includes a plurality of first electromagnetic driving members 8-410 and a plurality of second electromagnetic driving members 8-420, and the first electromagnetic driving members 8-410 and the second electromagnetic driving members 8-420 are disposed at the left side, the right side, and the back side of the second movable portion 8-300, the driving forces in different direction can be applied on the second movable portion 8-300. Moreover, since the first movable portion 8-200 can rotate around the first axis 8-AX1 relative to the fixed portion 8-100, and the second movable portion 8-300 can around the second axis 8-AX2 relative to the first movable portion 8-200, the driving assembly 8-400 can drive the second movable portion 8-300 and the optical member 8-30 disposed thereon to rotate around a rotation axis 8-R1 and/or a rotation axis 8-R2 by providing suitable driving forces. The rotation axes 8-R1 and 8-R2 are parallel or perpendicular to the outgoing direction 8-D2 of the light 8-L, so as that the light emitting to the object can horizontally shift.

The position sensor 8-440 is disposed on the circuit board 8-430 and corresponds to the second electromagnetic driving member 8-420. The position sensor 8-440 is configured to detect the position of the second electromagnetic driving member 8-420, so as to obtain the rotation angle of the second movable portion 8-300 relative to the fixed portion 8-100.

For example, the position sensors 8-440 can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

In summary, an optical member driving mechanism is provided. The optical member driving mechanism is configured to hold an optical member and drive the optical member to move. The optical member driving mechanism includes a first movable portion, a fixed portion, and a driving assembly. The first movable portion is movable relative to the fixed portion. The driving assembly is configured to drive the first movable portion to move relative to the fixed portion.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving mechanism for holding an optical member and driving the optical member to move, comprising:
   a first movable portion;
   a fixed portion, wherein the first movable portion can move relative to the fixed portion;
   a second movable portion, wherein the optical member is disposed on the second movable portion; and
   a driving assembly, configured to drive the first movable portion to rotate around a first axis relative to the fixed portion and drive the second movable portion to rotate around a second axis relative to the first movable portion,
   wherein the optical member is configured to adjust an emission direction of light from an incident direction to an outgoing direction, the incident direction is not parallel to the outgoing direction, and the first axis is perpendicular to the incident direction or the outgoing direction, wherein an acute angle is formed between the second axis and the first axis.

2. The optical member driving mechanism as claimed in claim 1, wherein the acute angle is greater than 45 degrees and less than 90 degrees.

3. The optical member driving mechanism as claimed in claim 1, wherein the second axis is not parallel or perpendicular to the outgoing direction.

4. The optical member driving mechanism as claimed in claim 1, wherein when the driving assembly drives the first movable portion to rotate around the first axis relative to the fixed portion, the second axis rotates around the first axis.

5. The optical member driving mechanism as claimed in claim 1, wherein the driving assembly can drive the second movable portion to rotate around a rotation axis relative to the fixed portion, and the rotation axis is parallel or perpendicular to the incident direction.

6. The optical member driving mechanism as claimed in claim 1, wherein the first movable portion comprises:
   a plurality of first supporting portions, pivotally connected to the fixed portion;
   a plurality of second supporting portions, pivotally connected to the second movable portion; and
   a plurality of connecting portions, connected to the first supporting portions and the second supporting portions.

7. The optical member driving mechanism as claimed in claim 6, wherein the first supporting portions are arranged along the first axis, and the second supporting portions are arranged along the second axis.

8. The optical member driving mechanism as claimed in claim 6, wherein the first movable portion has a C-shaped structure.

9. The optical member driving mechanism as claimed in claim 8, wherein at least one of the first supporting portions and at least one of the second supporting portions are respectively disposed on the opposite ends of the C-shaped structure.

10. The optical member driving mechanism as claimed in claim 6, wherein the second movable portion comprises a plurality of second engaging portions, and the second supporting portions are embedded in the second engaging portions.

11. The optical member driving mechanism as claimed in claim 10, wherein the second engaging portions have a plurality of chamfers or fillets, and the second supporting portions contact the chamfers or fillets.

12. The optical member driving mechanism as claimed in claim 1, wherein an intersection point of the first axis and the second axis is adjacent to the center of the optical member as seen from the incident direction.

13. The optical member driving mechanism as claimed in claim 1, wherein the first movable portion is made of metal.

14. An optical member driving mechanism for holding an optical member and driving the optical member to move, comprising:
   a fixed portion;
   a first movable portion, comprising:
      a plurality of first supporting portions, pivotally connected to the fixed portion;
      a plurality of second supporting portions; and
      a plurality of connecting portions, connected to the first supporting portions and the second supporting portions;
   a second movable portion, wherein the optical member is disposed on the second movable portion, and the second supporting portions are pivotally connected to the second movable portion; and
   a driving assembly, configured to drive the first movable portion to rotate around a first axis relative to the fixed portion and drive the second movable portion to rotate around a second axis relative to the first movable portion, wherein the fixed portion comprises a plurality of first engaging portions, and the first supporting portions are embedded in the first engaging portions,
   wherein the optical member is configured to adjust an emission direction of light from an incident direction to an outgoing direction, the incident direction is not parallel to the outgoing direction, and the first axis is perpendicular to the incident direction or the outgoing direction, wherein an acute angle is formed between the second axis and the first axis.

15. The optical member driving mechanism as claimed in claim 14, wherein the first engaging portions have a plurality of chamfers or fillets, and the first supporting portions contact the chamfers or fillets.

* * * * *